United States Patent [19]

Aron

[11] Patent Number: 5,784,873
[45] Date of Patent: Jul. 28, 1998

[54] HAYMAKING MACHINE WITH A FOLDABLE PROTECTION DEVICE

[75] Inventor: Jérôme Aron, Dossenheim-Sur-Zinsel, France

[73] Assignee: Kuhn S.A., Saverne Cedex, France

[21] Appl. No.: 820,889

[22] Filed: Mar. 21, 1997

[30] Foreign Application Priority Data

Mar. 29, 1996 [FR] France .................... 96 04143

[51] Int. Cl.⁶ .................................................. A01D 78/10
[52] U.S. Cl. .................... 56/377; 56/367; 56/379
[58] Field of Search .................... 56/365, 366, 367, 56/370, 377, 379

[56] References Cited

U.S. PATENT DOCUMENTS

| | | | |
|---|---|---|---|
| 742,752 | 10/1903 | Thompson | 56/379 |
| 3,650,101 | 3/1972 | Aron | 56/370 |
| 3,948,028 | 4/1976 | Reber | 56/365 |
| 4,144,699 | 3/1979 | Aron | 56/370 |
| 4,149,364 | 4/1979 | Aron | 56/366 |
| 4,166,352 | 9/1979 | Knüsting | 56/366 |
| 4,254,609 | 3/1981 | Van der Lely | 56/365 |
| 4,628,673 | 12/1986 | Aron | 56/370 |
| 4,656,821 | 4/1987 | Aron | 56/370 |
| 4,693,065 | 9/1987 | Aron et al. | 56/377 |
| 4,723,404 | 2/1988 | Aron | 56/370 |
| 4,875,332 | 10/1989 | Aron | 56/377 |
| 4,914,901 | 4/1990 | Aron | 56/370 |
| 4,922,700 | 5/1990 | Aron | 56/370 |
| 4,953,346 | 9/1990 | Aron | 56/11.1 |
| 5,024,053 | 6/1991 | Aron | 56/367 |
| 5,060,465 | 10/1991 | Jerome | 56/367 |
| 5,111,636 | 5/1992 | Quirin | 56/367 |
| 5,155,986 | 10/1992 | Kelderman | 56/365 |
| 5,177,945 | 1/1993 | Tonutti | 56/365 |
| 5,274,990 | 1/1994 | Aron et al. | 56/377 |
| 5,459,987 | 10/1995 | Hining et al. | 56/366 |
| 5,548,949 | 8/1996 | Gantzer | 56/367 |
| 5,586,421 | 12/1996 | Aron | 56/367 |
| 5,598,691 | 2/1997 | Peeters | 56/377 |

FOREIGN PATENT DOCUMENTS

| | | |
|---|---|---|
| 0 083 460 | 7/1983 | European Pat. Off. . |
| 0 310 532 | 4/1989 | European Pat. Off. . |
| 0 381 970 | 8/1990 | European Pat. Off. . |
| 0 391 093 | 10/1990 | European Pat. Off. . |
| 0 407 757 | 1/1991 | European Pat. Off. . |
| 0 454 602 | 10/1991 | European Pat. Off. . |
| 0 507 408 | 10/1992 | European Pat. Off. . |
| 87 12 165 | 12/1987 | Germany . |
| 87 09 233 | 1/1988 | Germany . |
| 37 43 025 | 6/1989 | Germany . |

*Primary Examiner*—Michael J. Carone
*Assistant Examiner*—Fredrick T. French, III
*Attorney, Agent, or Firm*—Oblon, Spivak, McClelland, Maier & Neustadt, P.C.

[57] ABSTRACT

The present invention relates to a haymaking machine including a chassis which carries several tedding and/or windrowing rotors. This chassis has lateral parts which can be folded upward for transport and/or setting down. A protection device which at least partially surrounds the rotors is connected to said chassis. This protection device includes lateral elements which can also be folded upward for transport and/or setting down.

Each lateral element of the protection device includes at least one substantially straight section which is guided in such a way that it can move longitudinally in a bearing which is connected to the corresponding lateral part of the chassis so as to reduce the height of the machine in this position.

7 Claims, 3 Drawing Sheets

HAYMAKING MACHINE WITH A FOLDABLE PROTECTION DEVICE

BACKGROUND OF THE INVENTION

1. Field of the Invention

The present invention relates to a haymaking machine including a chassis of elongated shape which carries several tedding and/or windrowing rotors equipped with working tools, which chassis is made in a central part and lateral parts which are articulated to the central part by means of pivots about which they can be folded upward for transport and/or setting down, a protection device which at least partially surrounds the rotors being connected to said chassis, which protection device includes lateral elements which can also be folded upward for transport and/or setting down and which can be moved in order to reduce the height of the machine in this transport and/or set-down position.

2. Discussion of the Background

In a known machine of this kind, the lateral elements of the protection device are made in two parts. The outer part of each lateral element is articulated to the part situated on the inside. In addition, it is connected by a guide lever to one end of an adjustment lever which at its middle is articulated to the outer rotor in such a way that it can rotate. Articulated to the other end of this adjustment lever is a control rod which is itself articulated to the rotor next to the outer rotor and is acted upon by a spring. When the lateral part of the chassis is moved upward, said rod makes the adjustment lever rotate about its axis of articulation. This adjustment lever then pulls on the guide lever which drives the outer part of the lateral element of the protection device. This outer part then pivots through an angle of approximately 270° with respect to the part situated on the inside. Thus it is directed downward in the transport and/or set-down position. Upon return to the work position it is pivoted outward again.

This embodiment requires numerous parts and an important number of articulations. It is relatively complicated and demands meticulous maintenance to allow all the articulations to operate correctly. Additionally, these articulations may develop play and make the device unstable.

SUMMARY OF THE INVENTION

The object of the present invention is especially to overcome the aforementioned drawbacks of the known machine. It needs to propose a haymaking machine with a protection device which is simple and robust, and the position of which is very easy to set.

To this end, an important feature of the invention consists in the fact that each lateral element of the protection device includes at least one substantially straight section which is guided in such a way that it can move longitudinally in a bearing which is connected to the corresponding lateral part of the chassis.

The lateral elements of the protection device can thus be moved in a straight path with respect to the lateral parts of the chassis in such a way that they extend beyond the tools of the rotors in the work position and that they are situated set back from said tools in the transport position. During work, the lateral elements of the protection device prevent access, at least from the front, into the path of the tools of the outer rotors. Thus collisions between these tools and persons, animals or obstacles which might lie in the path of the machine are avoided.

By contrast, during transport, said lateral elements do not have a protecting function. Their outer ends are therefore situated set back from the tools of the outer rotors, and this makes it possible to reduce the height of the machine.

The lateral elements of the protection device can be changed from one of the positions described to the other through a simple longitudinal displacement of said elements with respect to the lateral parts of the chassis. This movement is extremely simple to obtain. Additionally, the means to be employed are also very simple.

The invention also relates to the features below, taken in isolation or in any technically feasible combination thereof.

Each lateral element of the protection device is arranged in such a way that it moves automatically in the bearing or bearings which are connected to the corresponding lateral part of the chassis when this part pivots about its pivot linking it to the central part of the chassis. The lateral elements of the protection device are therefore positioned without any intervention from the user. This also guarantees that said elements are positioned correctly both in the work position and in the transport position.

Each lateral element of the protection device is articulated, by means of at least one axis pointing in the direction of forward travel, to a fixed support. This support is connected to the central part of the chassis and extends transversely to the direction of forward travel. The axis of articulation of each lateral element of the protection device is offset with respect to the pivot of the corresponding lateral part of the chassis in such a way that it exerts a pulling force on said lateral element during the movement into the transport and/or set-down position. This axis of articulation is situated, with respect to the middle of the machine, beyond a plane passing through the bisector of the pivoting angle of the corresponding lateral part of the chassis in order to change from the work position to the transport position or vice versa.

BRIEF DESCRIPTION OF THE DRAWINGS

Other features and advantages of the invention will emerge from the description which follows and which refers to the appened drawings which represent, by way of non-limiting example, one embodiment of the machine according to the invention.

In these drawings.

DESCRIPTION OF THE PREFERRED EMBODIMENTS

Figure 1:
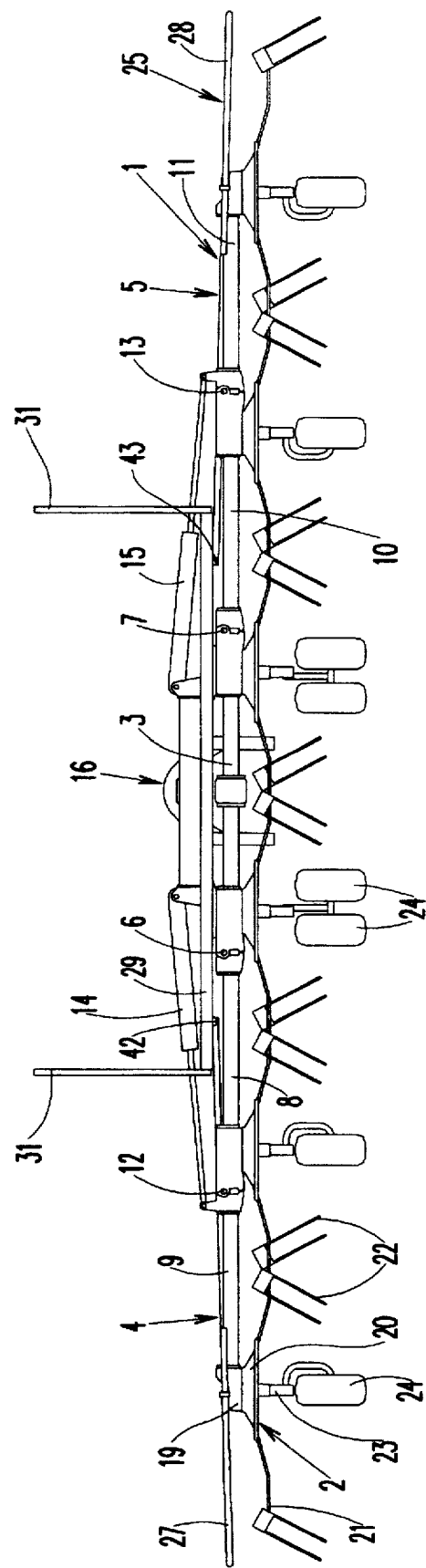
FIG. 1 represents a rear view of the machine according to the invention in the work position.
Figure 2:
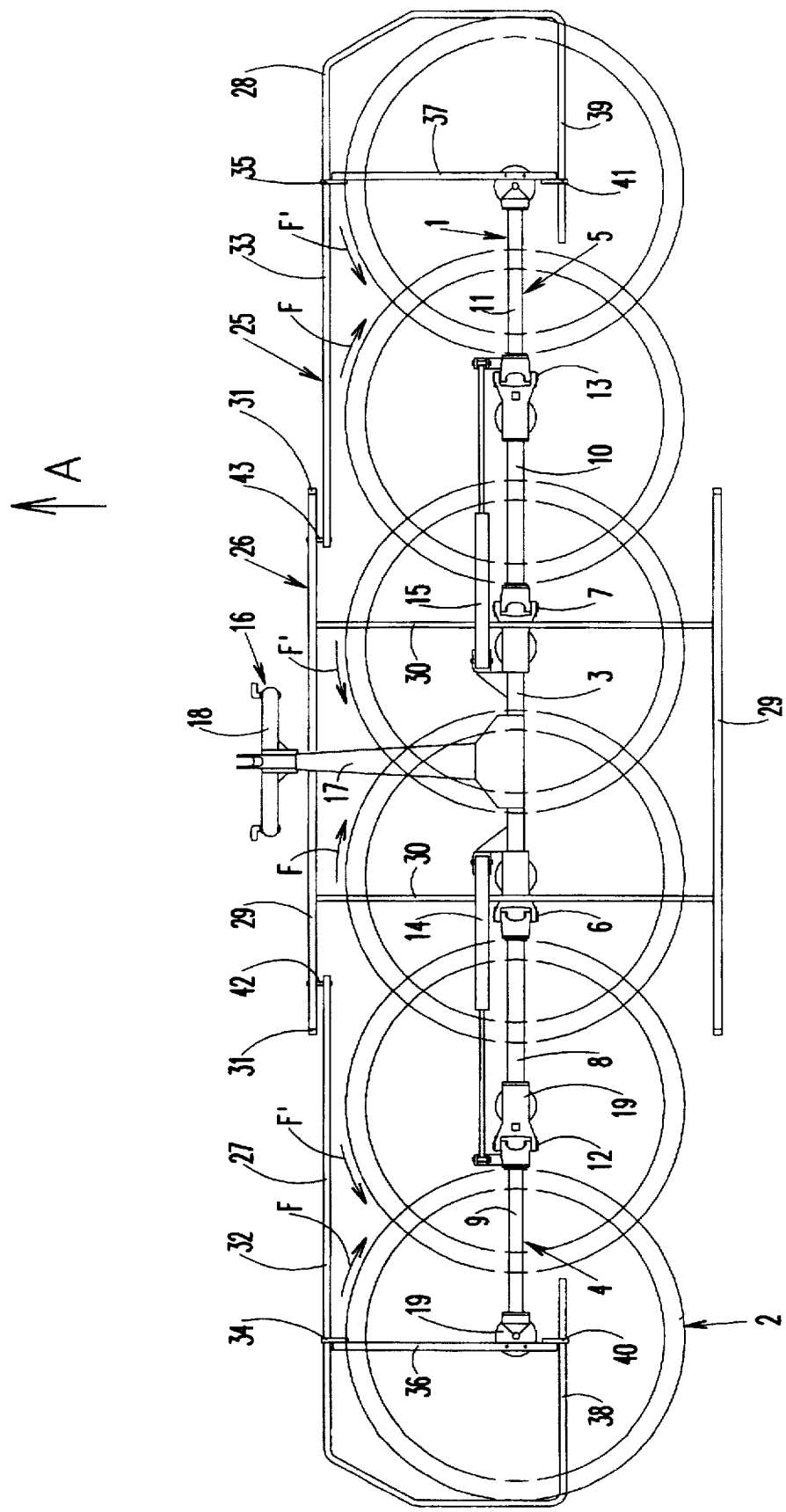
FIG. 2 represents a top view of the machine according to FIG. 1.
Figure 3:
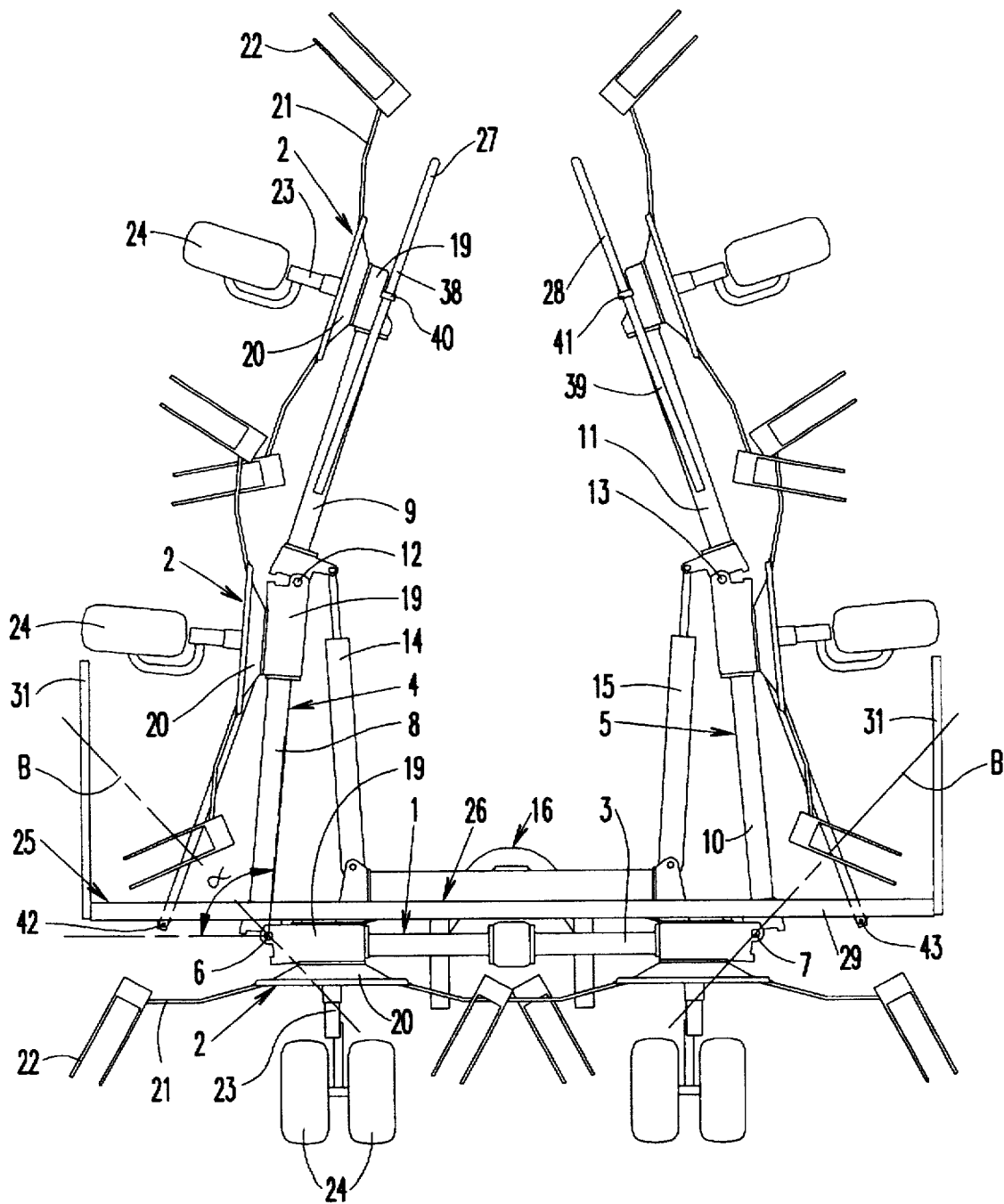
FIG. 3 represents a rear view of the machine in the transport and/or set-down position.

As emerges from FIGS. 1 to 3, the machine according to the invention includes a chassis 1 of elongated shape which carries several tedding and/or windrowing rotors 2. Said chassis 1 is composed of a central part 3 and of two lateral parts 4 and 5 which are articulated to the ends of the central part 3 by means of pivots 6 and 7 pointing in the direction of forward travel indicated by the arrow A. Each of these lateral parts 4 and 5 is made in two portions 8 and 9, 10 and 11 which are also articulated together by means of pivots 12 and 13 pointing in the direction of forward travel A. Each of the lateral parts 4 and 5 is, in addition, connected to the central part 3 by means of a hydraulic jack 14, 15 which makes it possible to move the corresponding lateral part 4, 5 about its pivot 6, 7 linking it to the central part 3. The latter is equipped with a device 16 for hitching it up to a tractor which has not been represented and which serves to drive the machine and make it move in the direction of forward travel A. This device 16 is composed of a beam 17 and of a crossbar 18 with three hitching points. The hitch device 16 could consist of a drawbar in the case of a machine of the trailed type.

The central part 3 of the chassis 1 carries two tedding rotors 2 and each portion 8 to 11 of the lateral parts 4 and 5 carries one tedding rotor 2. The machine represented thus has a total of six rotors 2. It will be understood that the number of rotors 2 can vary depending on the number of portions 8 to 11 of which the lateral parts 4 and 5 of the chassis 1 are composed. Each of these rotors 2 is associated with a casing 19 of the central part 3 or of the corresponding portions 8 to 11. Each rotor 2 has a hub 20 which is fitted with several arms 21. These extend radially and carry working forked tines 22. Said hub 20 is mounted in such a way that it can rotate on a substantially vertical support axis 23. For driving the rotors 2 in rotation, each hub 20 has a toothed ring which meshes with a pinion in the corresponding casing 19. Each of these pinions is mounted on a drive shaft which is housed in the central part 3 or the corresponding portion 8 to 11 of the chassis 1. These various drive shafts are connected together by universal joints or pin joints at the pivots 6, 7, 12 and 13. They are themselves driven in rotation by means of the tractor's power take-off, via an intermediate drive shaft.

Each support axis 23 of a rotor 2 at its lower end carries one or two support wheels 24 which can roll on the ground. Its upper end is mounted in a bearing of the corresponding casing 19.

The chassis 1 moreover carries a protection device 25 which extends on the front side and at least in part on the lateral sides of the outer rotors 2 (see FIG. 2). This protection device 25 could just as easily completely surround the rotors 2 of the machine. As represented, the protection device 25 is composed of a central element 26 and of two lateral elements 27 and 28. The central element 26 is formed of a rod 29 substantially parallel to the central part 3 of the chassis 1. It is situated ahead of the rotors 2 of this central part 3 and is fixed to the latter by means of small girders 30. Its length is such that it extends practically across the entire width of the two rotors 2 of the central part 3 of the chassis 1. It may at each of its ends have a substantially vertical bar 31 for protection when the machine is in the transport or set-down position. The central element 26 may include a second rod 29 identical to the aforementioned one, situated on the rear side of the rotors 2 of the central part 3 of the chassis 1.

In the work position, each lateral element 27, 28 of the protection device 25 extends in front, and partly on the outer side of the rotors 2 of the two portions 8 and 9 or 10 and 11 of one of the lateral parts 4 or 5 of the chassis 1. For transport and/or setting down, each lateral element 27, 28 can be folded upward and moved so as to reduce the height of the machine in this position. Each of these lateral elements 27, 28 is made as a single piece or as several pieces joined together. Each has at least one substantially straight section 32, 33 which is guided in such a way that it can move longitudinally in a bearing 34, 35 situated on the front side of the corresponding lateral part 4, 5. This bearing 34, 35 has an orifice for the passage of said section 32, 33 and the dimensions of which are slightly greater than those of this section. The bearing 34, 35 of the section 32, 33 of each lateral element 27, 28 is connected to a support 36, 37 which is fixed to the portion 9, 11 of the corresponding lateral part 4 or 5 of the chassis 1.

Each lateral element 27, 28 may include a second substantially straight section 38, 39 which is also guided in a bearing 40, 41 so that it can move longitudinally. Said sections 32, 33 and 38, 39 are substantially parallel. The second bearings 40, 41 are situated on the rear side of the portions 9, 11. They are connected to the latter by extensions pointing toward the rear of the supports 36 and 37.

Because they are connected to the portions 9, 11 of the lateral parts 4, 5 of the chassis 1, the lateral elements 27, 28 of the protection device 25 move with said lateral parts 4, 5 when they are brought from the work position into the transport and/or set-down position and vice versa. In the raised position for transport and/or setting down, the lateral elements 27, 28 can be moved downward by the sections 32, 33, 38, 39 sliding in the bearings 34, 35, 40, 41 so as to reduce the height of the machine. This sliding may be carried out manually or with the aid of movement means such as jacks.

The lateral elements 27, 28 of the protection device 25 may be arranged in such a way that their sections 32, 33, 38, 39 move automatically in the bearings 34, 35, 40, 41 when the corresponding lateral parts 4, 5 of the chassis 1 move about the pivots 6, 7 to change from the work position to the transport and/or set-down position and vice versa. In this case, each lateral element 27, 28 is articulated by means of at least one axis 42, 43 to the rod 29 of the central element 21 which constitutes a fixed support. Said axis of articulation 42, 43 points in the direction of forward travel A and is substantially parallel to the pivot 6, 7 of the corresponding lateral part 4, 5 of the chassis 1.

It emerges especially from FIG. 3 that the axis of articulation 42, 43 of each lateral element 27, 28 of the protection device 25 is offset with respect to the pivot 6, 7 of the corresponding lateral part 4, 5. The offset is such that said axis of articulation 42, 43 exerts a pulling force on the corresponding lateral element 27, 28 when the latter is moved into the transport position, and a pushing force when it returns to the work position. For this purpose, said axis of articulation 42, 43 is situated, with respect to the middle of the machine, beyond a plane B passing through the bisector of the pivoting angle α of the corresponding lateral part 4, 5 of the chassis 1 about the pivot 6, 7 in order to change from one position to the other.

According to another embodiment, which has not been represented, the second section 38, 39 of each lateral element 27, 28 is extended toward the middle of the machine. It is then articulated to a second axis which is aligned with the axis 42, 43. This second axis is arranged on the second rod 29 which is situated on the rear side of the central part 3 of the chassis 1. This embodiment is more robust.

During work, the machine according to the invention is coupled to a tractor which allows it to be moved in the direction A. The wheels 24 which are arranged under the rotors 2 roll on the ground. Said rotors 2 are driven in rotation from the tractor about their respective support axes 23 in such a way that they rotate converging in pairs at the front (arrows F and F'). During this rotation, their forked tines 22 gather the plants lying on the ground, pass them backward between the converging rotors 2 and spread them out again behind the machine, while at the same time turning them over. In this position, the central element 26 and the lateral elements 27 and 28 of the protection device 25 extend beyond the forked tines 22 and prevent foreign bodies, which could be injured and/or could cause damage, from reaching the rotors 2.

In order to place the machine in the transport position (see FIG. 3), the hydraulic jacks 14 and 15 are actuated in such a way as to make them shorten. They then pull on the lateral parts 4 and 5 of the chassis 1 and make them rotate upward, about the pivots 6 and 7, through an angle α of approximately 90° (FIG. 3). During this raising operation, said lateral parts 4 and 5 drive the lateral elements 27 and 28 of the protection device 25. These then pivot upward, by means of their axes 42 and 43, with respect to the central element 26. At the same time, these axes 42 and 43, on account of them being in an offset position with respect to the pivots 6 and 7, hold the lateral elements 27 and 28 down. The sections 32, 33 and 38, 39 of these lateral elements 27 and 28 therefore slide in the bearings 34, 35 and 40, 41. As a result of this, in the transport position, the upper ends of these lateral elements 27 and 28 are situated set back from the forked tines 22 of the rotors 2 situated at the ends. The height of the machine is thus reduced, which makes it easier for it to pass under any obstacles as well as making it easier to put it up in a shed. This also makes it possible to bring the outer portions 9 and 11 still closer to the middle of the machine. An additional reduction in height may be obtained by folding the upwardly-pointing arms 21 of the two outer rotors 2.

To return to the work position, the hydraulic jacks 14 and 15 are actuated to make them lengthen. The lateral parts 4 and 5 of the chassis 1 then return to the horizontal position. At the same time they drive the lateral elements 27 and 28 of the protection device 25 downward. Their substantially straight sections 32, 33 and 38, 39 slide automatically outward in the bearings 34, 35 and 40, 41 in such a way that the lateral elements 27 and 28 resume the position in which they again provide complete protection.

It is quite clear that the invention is not limited to the embodiment described and represented in the appended drawings. Modifications are possible, especially as regards the construction of the various elements or by the substitution of technical equivalents, without in any way departing from the field of protection.

What is claimed as new and desired to be secured by letters patent of the United States is:

1. A haymaking machine including:
    a chassis of elongated shape which carries several tedding and/or windrowing rotors equipped with working tools, which chassis is made in a central part and lateral parts which are articulated to the central part by means of pivots about which they can be folded upward for transport and/or setting down,
    a protection device which at least partially surrounds the rotors being connected to said chassis, which protection device includes lateral elements which can also be folded upward for transport and/or setting down and which can be moved so as to reduce the height of the machine in this transport and/or set-down position,
    wherein each lateral element of the protection device includes at least one substantially straight section which is guided in such a way that it can move longitudinally in a bearing which is connected to the corresponding lateral part of the chassis.

2. A Machine as claimed in claim 1, wherein each lateral element of the protection device includes two sections which are guided in two bearings, one of which is situated on the front side and the other on the rear side of the corresponding lateral part of the chassis.

3. A Machine as claimed in claim 1 or 2, wherein each lateral element of the protection device is arranged in such a way that the substantially straight sections move automatically in the bearing or bearings connected to the corresponding lateral part of the chassis when this lateral part pivots about its pivot linking it to the central part of the chassis.

4. A Machine as claimed in claim 3, wherein each lateral element of the protection device is articulated by means of at least one axis which points in the direction of forward travel and which is arranged on a fixed support.

5. A Machine as claimed in claim 4, wherein each lateral element of the protection device is articulated to the fixed support via two axes which are aligned with one another and which are situated one on the front side and the other on the rear side of the chassis.

6. A Machine as claimed in claim 4, wherein the axis of articulation of each lateral element of the protection device is offset with respect to the pivot of the corresponding lateral part of the chassis in such a way that it exerts a pulling force on said lateral element during the displacement into the transport and/or set-down position, and a pushing force during the displacement into the work position.

7. A Machine as claimed in claim 6, wherein the axis of articulation of each lateral element of the protection device is situated, with respect to the middle of the machine, beyond a plane which passes through the bisector of the pivoting angle of the corresponding lateral part of the chassis when changing from the work position to the transport and/or set-down position and vice versa.

* * * * *